United States Patent
Larsson et al.

(10) Patent No.: US 6,785,327 B1
(45) Date of Patent: *Aug. 31, 2004

(54) MULTIPORTED REGISTER FILE FOR BURST MODE COEFFICIENT UPDATING

(75) Inventors: Patrik Larsson, Matawan, NJ (US); Christopher John Nicol, Red Bank, NJ (US)

(73) Assignee: Agere Systems, Inc., Allentown, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 250 days.

(21) Appl. No.: 08/996,869

(22) Filed: Dec. 23, 1997

(51) Int. Cl.$^7$ ................................................ H03H 7/40
(52) U.S. Cl. ..................... 375/232; 375/229; 370/290; 708/322; 708/319
(58) Field of Search ................................ 375/232, 229; 708/322, 319; 712/36, 200; 370/290; 364/748.5

(56) References Cited

U.S. PATENT DOCUMENTS

| | | | | |
|---|---|---|---|---|
| 4,605,826 A | * | 8/1986 | Kanemasa | 370/290 |
| 5,117,385 A | * | 5/1992 | Gee | 708/319 |
| 5,297,071 A | * | 3/1994 | Sugino | 708/322 |
| 5,526,377 A | * | 6/1996 | Yedid et al. | 375/229 |
| 5,721,696 A | * | 2/1998 | Pan et al. | 364/748.5 |
| 5,944,813 A | * | 8/1999 | Trimberger | 712/36 |
| 6,112,291 A | * | 8/2000 | Scales et al. | 712/200 |
| 6,377,619 B1 | * | 4/2002 | Denk et al. | 375/232 |

OTHER PUBLICATIONS

European Patent Office Search Report, Application No. 98 30 9952, The Hague, Aug. 14, 2000.

* cited by examiner

*Primary Examiner*—Shuwang Liu

(57) ABSTRACT

Multiported register files used for storing coefficients in adaptive FIR are improved upon by implementing a split memory architecture that has the ability to separately control the least significant bits and the most significant bits of coefficient values that are stored in the filter. When the filter is operated to use so-called "burst mode" updating, the updating circuitry of the filter can be disabled and only the most significant bits of the coefficients are read out from the multiported register file while the least significant bits remain unchanged. This conserves power without sacrificing precision, since only certain ones of the bits of the coefficients are used in the multiplication of the sample. In addition, when only the most significant bits of the coefficients are being cycled through the register filter, any changing bits are prevented from being supplied to the updating circuit, so that the updating circuit performs no computation at all, rather than performing one that is discarded. Advantageously, using such improved multiported register files, adaptive FIR filters can be constructed which operate with lower power consumption.

41 Claims, 2 Drawing Sheets

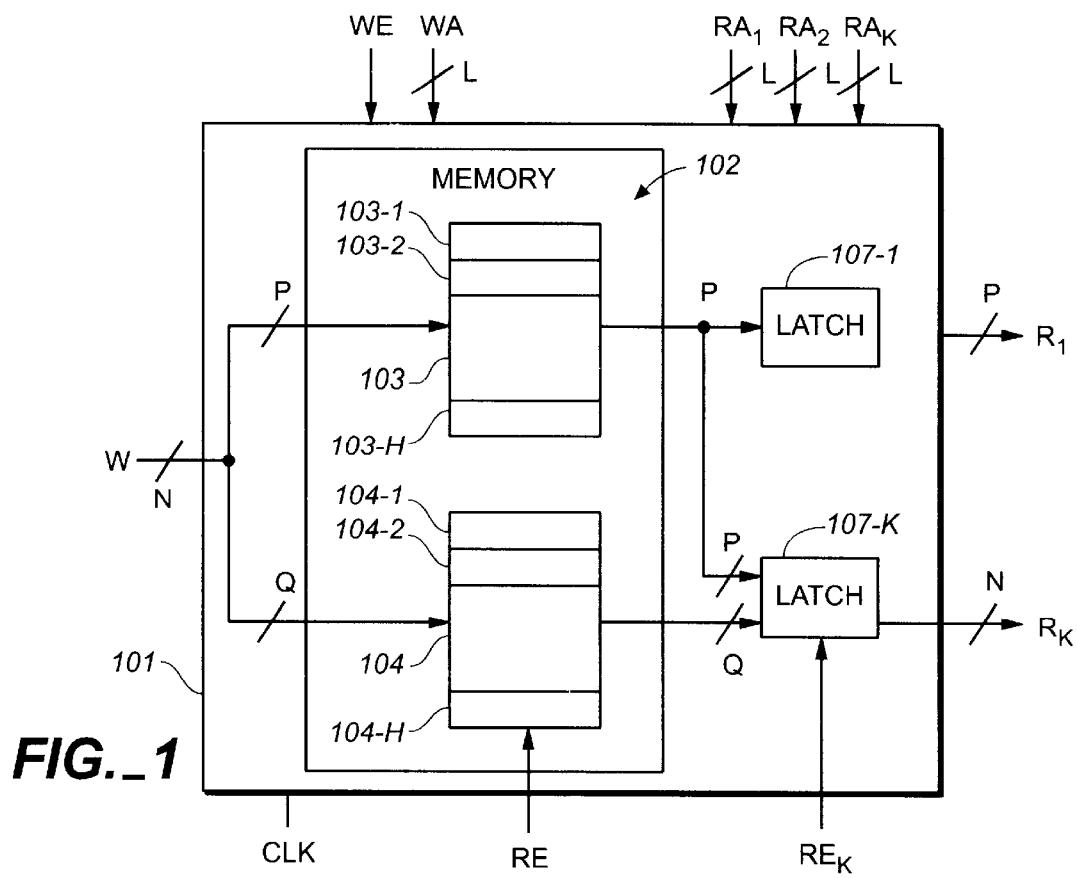
FIG._1
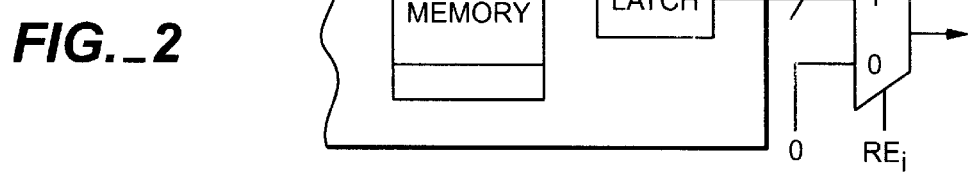
FIG._2
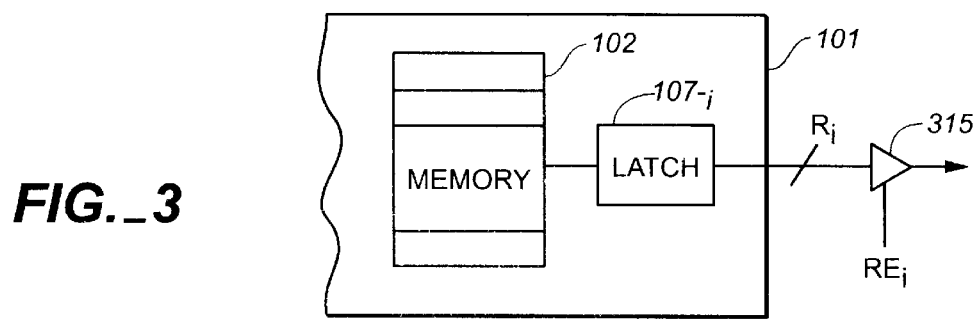
FIG._3

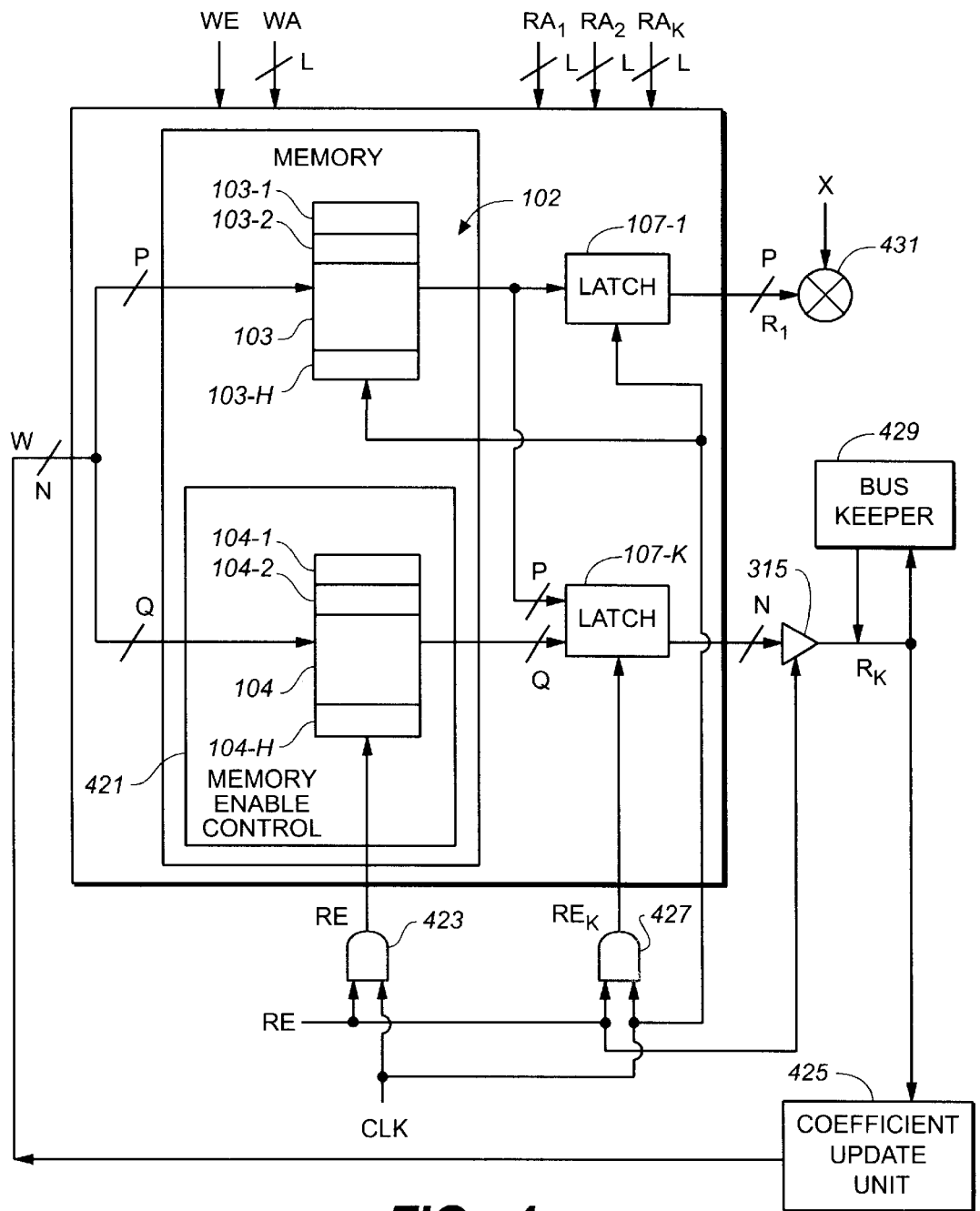
FIG._4

US 6,785,327 B1

MULTIPORTED REGISTER FILE FOR BURST MODE COEFFICIENT UPDATING

TECHNICAL FIELD

This invention relates to adaptive finite impulse response (FIR) filters, and more particularly, to adaptive FIR filters using time multiplexed multipliers with multiple coefficients per multiplier and which implement burst mode updating of the filter coefficients.

BACKGROUND OF THE INVENTION

Prior art finite impulse response (FIR) filters employ fixed delay lines for recirculating the coefficients. Such delay lines are implemented using a series of edge triggered flip flops. As a result, in operation, the prior art delay lines consume more power than is desirable.

In copending U.S. patent application Ser. No. 08/937665, assigned to the same assignee as the instant application, multiported register files are employed to implement the coefficient storage and to provide the delays in the coefficients that are necessary for filter operation. A multiported register file is a memory, typically small, e.g., having a capacity for four words, with at least one read port and one write port. Data written into the multiported register file may be read out therefrom in any desired order. The multiported register file may have additional output ports from which the data stored therein may be read out, also in any desired order, and independent from the order of any other output port. In regards to coefficients, each multiported register file feeds data from one output to the multiply-add portion of its associated stage of the FIR filter. Note that these outputs may be the same. For coefficient use, there is no need to operate the register file in the lookthrough mode described in the copending application.

When the FIR filter is an adaptive filter with updatable coefficients, it is necessary to have an update unit which computes new coefficient values.

In addition, multiported register files of the prior copending application circulated all of the bits of the coefficients all of the time. Each bit of the coefficient that is circulated requires incremental power consumption.

SUMMARY OF THE INVENTION

We have recognized that improved multiported register files may be used for storing coefficients in adaptive FIR filters. In accordance with the principles of the invention, the multiported register files of prior copending application are improved upon by implementing a split memory architecture, with the ability to separately control the least significant bits and the most significant bits of coefficient values that are stored in the filter. When the filter is operated to use so-called "burst mode" updating—such as disclosed in U.S. Pat. No. 5,646,957 issued to Im et al., assigned to the same assignee as the present invention, which is incorporated by reference as if fully set forth herein—which only requires updating when predefined error conditions are encountered, the updating circuitry of the filter can be disabled and only the most significant bits of the coefficients are read out from the multiported register file while the least significant bits remain unchanged. This conserves power without sacrificing precision, since only certain ones of the bits of the coefficients are used in the multiplication of the sample. In addition, in accordance with an aspect of the invention, when only the most significant bits of the coefficients are being cycled through the multiported register filter, any changing bits are prevented from being supplied to the updating circuit, so that the updating circuit performs no computation at all, rather than performing one that is discarded. Advantageously, using such improved multiported register files, adaptive FIR filters can be constructed which operate with lower power consumption.

Additionally, the split architecture and disabling techniques may be used to provide advantages in architectures that use recirculating registers, such as the aforementioned

BRIEF DESCRIPTION OF THE DRAWING

In the drawing:

FIG. 1 shows an exemplary, in accordance with the principles of the invention;

FIG. 2 shows another embodiment of the invention using an external multiplexer; and FIG. 3 shows yet another embodiment of the invention using a tri-state driver.

FIG. 4 shows an embodiment of the invention which conveys the flexibility and options available when applying the principles of the invention.

DETAILED DESCRIPTION

FIG. 1 shows an exemplary multiported register file which may be used for coefficient storage in a stage of a finite impulse response filter (FIR), in accordance with the principles of the invention. A multiported register file is a memory, typically small, e.g., having a capacity for four words, with at least one read port and one write port. Data written into the multiported register file may be read out therefrom in any desired order. The multiported register file may have additional output ports from which the data stored therein may be read out, also in any desired order, and independent from the order of any other output port.

More specifically, FIG. 1 shows multiported register file 101, including a) memory locations 102, which is divided into memory locations 103, including memory locations 103-1 through 103-H and memory locations 104, including memory locations 104-1 through 104-H, and b latches 107, including latches 107-1 through 107-K.

Memory locations 103 are used to store the most significant bits of each of the coefficients stored in one of memory locations 102, while memory locations 104 are used to store the least significant bits of each of the coefficients stored in one of memory locations 102. Thus, each of memory locations 102, has a "split" architecture, being split between its most significant bits and its least significant bits. Generally, the number of bits supplied by multiported register file 101 to a multiplier of the FIR filter into which it incorporated is the number of bits stored in each of memory locations 103. The remaining bits of each coefficient are stored in each of memory locations 104. In an exemplary embodiment of the invention, the ones of locations of memory location 103 and 104 that have the same suffix correspond to the same one of memory locations 102, and thus to the same coefficient. As is common filter design practice, all of the bits of a coefficient, including both those stored in one of memory locations 103 and 104, are employed when the coefficient is updated, if it is updated.

Although arbitrarily selectable at the discretion of the filter designer, H1, the number of memory locations in the multiported register file is typically a small number, e.g., 4. Having a small value of H allows efficient FIR filter implementations—compared with other alternatives for implementing FIR filters—for processing signals having a sample rate that is within an order of magnitude of the fastest clock frequencies in the system, such as is found in modems for use in broadband access.

Data is written to multiported register file 101 via write port W, which includes N data lines. The particular one of memory locations 102 to which data presented at write port W is written to is specified by write address WA. More particularly, the P most significant bits are written to the one of memory locations 103 specified by write address WA, and similarly, the Q least significant bits are written to the one of memory locations 104 specified by write address WA.

When and whether data is written to multiported register file 101 is a function of the value of write enable signal WE. When WE has a first value data is written to multiported register file 101. When WE has the complementary value of the first value data is not written to multiported register file 101.

Data is read from multiported register file 101 via any of read ports R, including read ports $R_1$ through $R_K$. Each of read ports $R_1$ through $R_K$ includes a respective number of data lines $M_1$ through $M_k$. For example, in the embodiment of the invention shown in FIG. 1, for read port $R_1$, $M_1$ is equal to P, while for $R_k$, $M_k$ is equal to N=P+Q. If desired, a less precise representation of a value stored in multiported register file 101 may be read out therefrom. The particular one of memory locations 103 and 104 from which data is read for presentation to any one of read ports $R_1$ through $R_K$ is specified by an address supplied to the corresponding, e.g., like numbered, one of read address ports $RA_1$ through $RA_k$. Typically, write address WA, and read address $RA_1$ through $RA_k$ have the same number of address lines, L.

While in prior versions of multiported register files no read enable signal is necessary to cause an output to appear at any of read ports $R_1$ through $R_K$, and instead simply supplying the appropriate read address is sufficient to generate the corresponding output, in accordance with the principles of the invention a read enable signal is provided on one or more of read ports $R_1$ through $R_K$ to prevent unwanted data reads which can cause unnecessary power consumption.

Data may be written to and read from multiported register file 101 at the same time. More specifically, data may be written to and read from the same particular one of memory locations 102 at the same time. Thus, a first value may be written to a particular one of memory locations 102 while at the same time a different value may be read from that very same particular location and supplied to one, or more, of read ports $R_1$ through $R_K$. In addition, under particular operating conditions of the FIR filter, in accordance with an aspect of the invention, only the most significant bits of a coefficient, stored in one of memory locations 103, may be supplied to a particular one of read ports $R_1$ through $R_K$.

Latches 107 are conventional level sensitive latches such as are described by N. Weste and K. Eshraghian on pages 19–21 of Principles of CMOS VLSI Design, 2nd Ed., Addison Wesley, 1992, which is incorporated by reference as if fully set forth herein. Thus, any one of memory locations 103 may act as a master latch while any one of latches 107 may act as a slave latch to form an edge triggered flip-flop.

There are different techniques for use in reading data from one or memory locations 102 out to one of ports $R_1$ through $R_K$. For example, read port $R_1$ reads out only the most significant bits of a coefficient which are stored in memory locations 103. Alternatively, read port $R_K$ reads all the bits of a coefficient stored in memory location 102, but only supplies an output to read port $R_k$ when read enable signal RE is in a particular stage, e.g., when RE is high. At all other times, the value of read port $R_K$ remains static at the last value stored in latch 107-K. The effect of read enable signal RE may be implemented in the register file by gating, e.g., AND gating, the read enable signal and the clock which is used for accessing memory locations 102.

In another embodiment of the invention, a read enable may be used in conjunction with memory locations 104. In particular, unless the read enable signal has a specified value, e.g., high, no coefficient least significant bit values are read out of memory locations 104, regardless of the presence of valid read addresses at any of read address ports $RA_1$ through $RA_k$.

As is well known, burst mode coefficient updating updates coefficients when errors exceed a predetermined threshold while leaving the coefficients unchanged when errors are less than a predetermined threshold. In view of the foregoing, advantageously, in accordance with an aspect of the invention, burst mode coefficient updating may be implemented efficiently as follows. When coefficients are being updated a read enable signal RE for the reading of memory locations 104 is enabled, e.g., set high, so that data is read out from memory locations 104. Additionally, the read enable control signal $RE_k$ for read port $R_k$ is used to read out from memory locations 102 coefficient values already stored therein. Also, the write enable WE control signal is enabled to write into memory locations 102 updated coefficient values which are supplied from a coefficient updating unit in a conventional manner.

When coefficients are not being updated, the write enable WE control signal and the read enable control signal $RE_k$ for read port $R_k$ are disabled, e.g., set to a low value. As a result, no changes occur in the data appearing at the output of read port $R_k$. In other words, the data appearing at the output of read port $R_k$ remains constant. This may be implemented by gating, e.g., AND gating, read enable control signal $RE_k$ with the clock used for controlling latches 107, and using the gated signal as the clock for latch 107-K.

Additionally, a read enable signal RE for the reading of memory locations 104 is disabled, e.g., set low, so that data is not read out from memory locations 104. This may be implemented by gating, e.g., AND gating, read enable control signal RE with the clock used for memory locations 102, and using the gated signal as the clock for memory 104. Given that the value of P is typically on the same order as that of Q, the power consumed by memory locations 102 is reduced, by on order of about 50%, when coefficients are not being updated. This can result in a significant power savings, as a goal of burst mode updating is to minimize the time during which coefficient updating takes place.

In a filter design, the output of read port $R_k$ is supplied to updating circuitry, e.g., an adder. If there are changes occurring in the data supplied to updating circuitry, as in the prior art, then computations are performed by the updating circuitry. Such computations inherently consume power. However, by not supplying changing data to the updating circuit, in accordance with the principles of the invention, such power consumption is avoided, as the inputs to the updating circuitry remain static, and so does its output.

As is well known, e.g., from U.S. Pat. No. 5,646,957, it is necessary to turn off the other inputs to the updating circuitry in order to reduce power consumption. When doing so in combination with the invention, the minimum power consumption, which is nearly zero, is achieved for the updating circuitry.

In fact, in some applications of the invention, the total filter power consumption may be reduced by more than half.

In another implementation of the invention, by using read enable signal RE to disable reading, and hence changes, from memory 104, it is only necessary to separately disable the most significant bits from reaching the updating circuitry, e.g., by using read enable control signal $RE_k$ to control only the latching of by latch 107-K of the most significant bits from memory 103.

Note, that an optional computation unit, such as disclosed in copending U.S. patent application Ser. No. 08/996,868 may be incorporated between memory locations 102 and one or more of output ports $R_1$ through $R_K$.

In accordance with another embodiment of the invention, which is shown in FIG. 2, instead of having read enable signals RE to control the outputs of latches 107, an external multiplexer can be used to supply as an output a constant value when coefficients are not being updated. Note that in connection with a multiplexer, a constant value means the same value which is fixedly input to one input port of the multiplexer. In yet a further embodiment of the invention, shown in FIG. 3, tri-state driver 315 may be used. In the embodiments shown in FIGS. 2 and 3, a read enable signal $RE_1$ is used to control the respective multiplexer or driver. Furthermore, in the embodiment of FIG. 3, a bus-keeper circuit may be used in conjunction with tri-state driver 315 to insure that the previous value of a coefficient remains on the lines to the update unit. When a bus-keeper circuit is used, the value that remains on the lines to the update unit is referred to as a steady value.

Additionally, the split architecture and disabling techniques may be used to provide advantages in architectures that use recirculating registers, such as in the aforementioned U.S. Pat. No. 5,646,957.

Note that in another embodiment of the invention, substantially the same results can be obtained by having two separate multiported register files, one for the most significant bits and one for the least significant bits. These multiported register files would be supplied with the same read and write signals, as appropriate. However, such an architecture is more costly, in that it requires extra decoders, such as, read address decoders and write address decoders.

FIG. 4 shows an embodiment of the invention which better conveys the flexibility and options available when applying the principles of the invention. As shown in FIG. 4 there are added to the basic elements of FIG. 1, a) memory locations 104 readout control structure 421, b) gate 423, c) coefficient update means 425, d) logic gate 427, e) bus keeper 429, and f) multiplier 431.

Memory locations 104 readout control structure 421 controls the reading out of memory locations 104 so that the memory locations are only read out in response to the read enable signal RE being enabled. In a typical practical implementation, as will be recognized by one of ordinary skill in the art, memory locations 104 readout control structure 421 is blended in conjunction with the control signals for accessing memory locations 104, and so may not be explicitly visible, such as in the manner shown and described in conjunction with FIG. 1.

Gate 423 is a gate, such as AND gate, which may be used to implement the effect of read enable signal RE by gating, e.g., AND gating, the read enable signal and the clock which is used for accessing memory locations 102. Coefficient update unit 425 performs the calculations necessary to derive the new coefficient values that are stored back into memory locations 102. Logic gate 427 is a gate, e.g., an AND gate, to control the operation of latch 107-K in conjunction with clock signal CLK.

Bus-keeper circuit 429 is used in conjunction with tri-state driver 315 to insure that the previous value of a coefficient remains on the lines to the update unit. When bus-keeper circuit 429 is used, the value that remains on the lines to the update unit is referred to as a steady value.

Multiplier 431 is a multiplier of the filter incorporating the multiported register file. It receives a coefficient value from the multiported register file, as well as a sample value, X, to multiply together for filtering purposes.

The foregoing merely illustrates the principles of the inventions. It will thus be appreciated that those skilled in the art will be able to devise various arrangements which, although not explicitly described or shown herein, embody the principles of the invention and are included within its spirit and scope.

What is claimed is:

1. A device for storing coefficients for use, in an adaptive FIR filter comprising:
    a multiported register file comprising:
        a memory comprising locations to store coefficient values, said memory being arranged in a split grouping so that common controls may be applied, in a multiplexed manner, to memory locations that store the least significant bits of at least two coefficient values; and
        means for controlling reading out of said least significant bits of said at least two of said coefficient values.

2. The invention as defined in claim 1 wherein said means for controlling is responsive to a read enable signal.

3. The invention as defined in claim 1 wherein said means for controlling is a gate coupled to a read enable signal and a clock for providing timing to said memory.

4. The invention as defined in claim 3 further comprising:
    coefficient update means receiving coefficient values from said memory via a port of said memory; and
    means for controllably preventing value changes appearing at said port from being supplied to said coefficient update means.

5. The invention as defined in claim 3 wherein said means controllably preventing changes includes at least a read enable control for said least significant bits of said memory.

6. The invention as defined in claim 3 further comprising a latch which coupled to said memory for supplying as an output coefficient data for updating and wherein said means controllably preventing changes includes at least a read enable control for said latch.

7. The invention as defined in claim 3 further comprising a latch which coupled to said memory for supplying as an output coefficient data for updating and wherein said means controllably preventing changes includes at least a read enable control for said least significant bits of said latch.

8. The invention as defined in claim 3 further comprising a latch which coupled to said memory for supplying as an output coefficient data for updating and wherein said means controllably preventing changes includes at least a read enable control for all bits of said latch.

9. The invention as defined in claim 3 wherein said means for controllably preventing includes at least a logic gate for gating a clock signal with a read enable signal.

10. The invention as defined in claim 3 wherein said means for controllably preventing includes a multiplexer which controllably provides at least (i) said least significant bits which are currently being read out from said memory and (ii) either said most significant bits which are currently being read out from said memory or a constant value.

11. The invention as defined in claim 3 wherein said means for controllably preventing includes a multiplexer which controllably provides at least (i) said one of said coefficients is currently being read out from said memory or (ii) a constant value.

12. The invention as defined in claim 3 wherein said means for controllably preventing includes at least a tri-state logic gate which provides as an output at least (i) the value supplied to it as an input or (ii) a high impedance.

13. The invention as defined in claim 3 wherein said means for controllably preventing includes at least:
a tri-state logic gate which provides as an output at least (i) the value supplied to it as an input or (ii) a high impedance; and
a bus keeper circuit coupled to said output of said tri-state logic gate.

14. The invention as defined in claim 3 wherein said means for controllably preventing includes at least a tri-state logic gate with a bus keeper which provides as an output at least (i) the value supplied to it as an input or (ii) a high impedance, so that a previous coefficient value which appeared at said output of said to logic gate remains constant.

15. A multiported register file for storing coefficients for use in an adaptive FIR filter comprising:
a memory for storing coefficient values, said memory being arranged in a split grouping so that common controls may be applied, in a multiplexed manner, to the least significant bits of at least two of said coefficient values; and
a first enable control for switching off reading out of said least significant bits of said at least two of said coefficient values from said memory; and
a second enable control for controlling at least a portion of an output of a latch coupled to said memory.

16. The invention as defined in claim 15 wherein said first enable control includes at least a logic gate having at least a first input to which is supplied a clock signal and a second input to which is supplied a read enable signal.

17. The invention as defined in claim 15 wherein said second enable control includes at least a logic gate having at least a first input to which is supplied a clock sign al and a second input to which is supplied a read enable signal.

18. The invention as defined in claim 15 wherein said second enable only controls the most significant bits of said latch output.

19. The invention as defined in claim 15 wherein said second enable only controls bits of said latch output not switched off by said first enable control.

20. The invention as defined in claim 15 wherein said second enable control includes a multiplexer.

21. The invention as defined in claim 15 wherein said second enable control includes a tri-state driver.

22. The invention as defined in claim 15 wherein said second enable control includes a tri-state driver with a bus-keeper.

23. The invention ass defined in claim 15 wherein said multiported register file further comprises:
a second output latch coupled to said memory, wherein, at substantially the same time, coefficient values supplied to said second output latch may be from a different memory location than is supplied to said output latch.

24. An adaptive filter including a multiported register file, said filter being arranged to operate using burst mode updating, said multiported register file comprising:
a first output port for supplying coefficient data to a coefficient update unit; and
a second output port for supplying coefficient information to a multiplier of said filter;
wherein said first output port is disabled from supplying a changing value when said filter is operated to not update its coefficient values.

25. The invention as defined in claim 24 wherein said multiported register file contains a memory, said memory being divided into a most significant bit portion and a least significant bit portion.

26. The invention as defined in claim 24 wherein, said multiported register file contains a memory, said memory being divided into a most significant bit portion and a least significant bit portion.

27. The invention as defined in claim 24 wherein, when said filter is updating coefficient values, said coefficient value supplied to said first output port and said second output port need not be the same.

28. A method for use in a operating a multiported register file for storing coefficient values in a memory that has a split architecture, the method comprising the steps of:
supplying most significant bits of at least one of said coefficients to a first output of said multiported register file; and
preventing changes in a coefficient value supplied to a second output of said multiported register file at substantially the same time as said supplying.

29. The invention as defined in 28 wherein said first output is coupled to a coefficient input of a multiplier of a filter.

30. The invention as defined in 28 wherein said second output is coupled to a coefficient update unit of a filter.

31. The invention as defined in 28 wherein said second output is coupled to a coefficient update unit of a filter.

32. The invention as defined in 28 wherein said preventing step includes at least disabling reading out of least significant bits of a currently addressed memory location.

33. The invention as defined in 28 wherein said preventing step includes tri-stating said second output.

34. The invention as defined in 28 wherein said preventing step includes at least disabling reading out of least significant bits of a currently addressed memory location and tri-stating most significant bits of a currently addressed memory location.

35. The invention as defined in 28 wherein said preventing step includes switching said second output to a steady value.

36. The invention as defined in 28 wherein said preventing step includes switching said second output to a constant value.

37. The invention as defined in claim 36 wherein said switching is performed using a multiplexer.

38. The invention as defined in 28 wherein said preventing step includes at least disabling reading out of least significant bits of a currently addressed memory location and supplying a constant value in lieu of most significant bits of a currently addressed memory location.

39. The invention as defined in 28 wherein said preventing step is performed when said multiported register file is part of a filter that is operated using burst mode updating and said coefficients need not be updated.

40. A method for operating a multiported register file in an adaptive filter, the method comprising the steps:
configuring a coefficient updating unit to update coefficients of the adaptive filter;
updating coefficients of the adaptive filter using burst mode; and reading out least significant bits of coefficients stored in a memory of said multiported register file only when said coefficients are being updated.

41. The invention as defined in claim 40 further including the step of supplying a non-changing value to a coefficient updating unit which is used to update said coefficients in lieu of said coefficients only when said coefficients are not being updated.

* * * * *